United States Patent

Branchetti et al.

[11] Patent Number: 5,778,012
[45] Date of Patent: Jul. 7, 1998

[54] MEMORY DEVICE WITH IMPROVED YIELD AND RELIABILITY

[75] Inventors: Maurizio Branchetti, San Polo D'Enza; Carla Golla, Sesto San Giovanni; Giovanni Campardo, Bergamo, all of Italy

[73] Assignee: SGS-Thomson Microelectronics S.r.l., Agrate Brianza, Italy

[21] Appl. No.: 671,848

[22] Filed: Jun. 28, 1996

[30] Foreign Application Priority Data

Sep. 29, 1995 [EP] European Pat. Off. .............. 95830408

[51] Int. Cl.$^6$ ................................................. G11C 29/00
[52] U.S. Cl. ................................. 371/40.4; 371/40.18
[58] Field of Search ............................ 371/40.4, 40.18

[56] References Cited

U.S. PATENT DOCUMENTS

| | | | |
|---|---|---|---|
| 4,112,502 | 9/1978 | Scheuneman | 395/182.03 |
| 4,249,253 | 2/1981 | Gentili et al. | 371/40.3 |
| 4,612,640 | 9/1986 | Mehrotra et al. | 371/40.4 |
| 4,903,268 | 2/1990 | Hidaka et al. | 371/40.4 |
| 5,056,095 | 10/1991 | Horiguchi et al. | 371/40.3 |
| 5,063,565 | 11/1991 | Ohashi | 371/40.2 |
| 5,117,428 | 5/1992 | Jeppesen, III et al. | 395/183.21 |
| 5,228,046 | 7/1993 | Blake et al. | 371/38.1 |
| 5,263,031 | 11/1993 | Inoue | 371/40.4 |
| 5,287,364 | 2/1994 | Kimura | 371/40.4 |
| 5,392,301 | 2/1995 | Fukushima | 371/40.4 |
| 5,448,578 | 9/1995 | Kim | 371/40.4 |
| 5,469,451 | 11/1995 | Henmi | 371/40.4 |
| 5,621,682 | 4/1997 | Tanzawa et al. | 365/185.03 |
| 5,682,394 | 10/1997 | Blake et al. | 371/21.1 |

FOREIGN PATENT DOCUMENTS

| | | |
|---|---|---|
| A-0 141 743 | 5/1985 | European Pat. Off. . |
| A-0 381 405 | 8/1990 | European Pat. Off. . |

*Primary Examiner*—Reba I. Elmore
*Assistant Examiner*—Robert J. Dolan
*Attorney, Agent, or Firm*—Wolf, Greenfield & Sacks, P.C.; James H. Morris

[57] ABSTRACT

A memory device including first and second memory cell arrays in which are stored respectively user data and error identification and correction data. The memory device also includes first and second decoding means operationally connected to the first and the second memory cell arrays for producing select user data signals and select error identification and correction data signals. The memory device further includes error identification means operationally coupled to the first and the second decoding means. The memory device also comprises error correction means operationally connected to the first and the second decoding means and to the error identification means. Finally the memory device includes a control unit operationally connected to the second decoding means, to the error identification means and to the error correction means to enable the second decoding means and the error correction means if the error identification means detect an error in the select user data signals.

16 Claims, 3 Drawing Sheets

| i | source $\bar{u}$ | code $\bar{w}$ | i | source $\bar{u}$ | code $\bar{w}$ |
|---|---|---|---|---|---|
| 0 | 0000 | 0000000 | 8 | 1000 | 1000101 |
| 1 | 0001 | 0001011 | 9 | 1001 | 1001110 |
| 2 | 0010 | 0010110 | 10 | 1010 | 1010011 |
| 3 | 0011 | 0011101 | 11 | 1011 | 1011000 |
| 4 | 0100 | 0100111 | 12 | 1100 | 1100010 |
| 5 | 0101 | 0101100 | 13 | 1101 | 1101001 |
| 6 | 0110 | 0110001 | 14 | 1110 | 1110100 |
| 7 | 0111 | 0111010 | 15 | 1111 | 1111111 |

Fig. 4

| i | source $\bar{u}$ | code $\bar{w}*$ | i | source $\bar{u}$ | code $\bar{w}*$ |
|---|---|---|---|---|---|
| 0 | 0000 | 0000000 | 8 | 1000 | 11000101 |
| 1 | 0001 | 10001011 | 9 | 1001 | 01001110 |
| 2 | 0010 | 10010110 | 10 | 1010 | 01010011 |
| 3 | 0011 | 00011101 | 11 | 1011 | 11011000 |
| 4 | 0100 | 00100111 | 12 | 1100 | 11100010 |
| 5 | 0101 | 10101100 | 13 | 1101 | 01101001 |
| 6 | 0110 | 10110001 | 14 | 1110 | 01110100 |
| 7 | 0111 | 00111010 | 15 | 1111 | 11111111 |

MEMORY DEVICE WITH IMPROVED YIELD AND RELIABILITY

BACKGROUND OF THE INVENTION

1. Field of the Invention

The present invention relates to memory devices and in particular to a Flash EEPROM memory device with improved yield and reliability.

2. Description of the Related Art

Most of problems encountered in the production of Flash EEPROM memory devices concern production process yield and final product reliability.

By the term 'yield' is indicated a parameter which specifies quantitatively the number of memory devices produced which operate in a manner conforming to design specifications when subjected to electrical testing. The causes which reduce yield of memory devices are mainly due to defects present in the cell array. The cell array comprises a plurality of memory cells in which are stored binary data and occupies a large part of the area of the integrated memory device. The defects which decrease the yield of memory devices can be divided in two main classes:

- defects due to pairs of rows whose metallizations are short-circuited between them, and
- defects due to single cells having electrical characteristics incompatible with those necessary to have correct operation of the device. To remedy the malfunctions caused by the defects belonging to the first class there is used the so-called 'row redundancy' which uses supplementary rows included in the cell array. To remedy the malfunctions caused by the defects belonging to the second class there is used the so-called 'column redundancy', which uses supplementary columns included in the cell array. The principle on which are based row redundancy and column redundancy is essentially the same, i.e. replacement of the damaged element with a corresponding redundant element. The 'replacement' is performed by a logic circuitry.

Although advantageous in some ways, row redundancy and column redundancy have a serious shortcoming due to the greater complexity of the logic circuitry which menage them when the size of the memory device increases. The reasons for this is that selection of a redundant element must be done by comparing row and column address signals supplied at the input of the device with row and column address signals memorized in a register included in the device. The latter signals correspond to the locations of the rows or columns of the cell array which should be replaced.

An error correction code also can be used to obviate the same type of defects which are presently resolved through the use of column redundancy. If the probability that a single memory cell will be defective is indicated by the parameter"p", it is possible to plot a graph representing the behavior of the probability of the events not reparable for the memory device containing the memory cell, as a function of the parameter p.

In FIG. 1 are shown two graphs representing the behavior of the probability of the irreparable events for a memory device. The first graph was obtained by using a redundancy system which has four additional columns for each memory block comprising $2^{10}$ rows and $2^{10}$ columns. The second graph was obtained using an error correction code of Hamming type with $2^7$ bits of user data and $2^3$ bits of parity control. The bits of parity control are capable of correcting a single error. Point designated A relates to a situation in which the value of the probability p is approximately equal to:

$$p=0.8*10^{-5}$$

To a probability of this value corresponds a yield of 20% produced by the column redundancy while the yield obtainable using the error correction code is practically 100%. This comparison is correct if the defects are uniformly distributed on the cell array.

The term 'reliability' indicates the ability of a device to remain in conformity with the design specifications for a long time.

In the case of Flash EEPROM memory devices reliability is particularly important because these devices must be able to keep the binary data stored in them for long periods of time. At the same time it must be possible to perform an adequate number of write and delete operations on the cells. It is noted that a memory cell includes one floating-gate MOS transistor of which it is possible to control the threshold voltage by injection of charges through a gate oxide. After a determinated period of time dispersion of the characteristics of the memory cell will occur and hence increase in the probability of committing errors by the memory device. This dispersion is due to the currents traversing the gate oxide. These currents produce the effect of worsening the dielectric characteristics of the gate oxide with the result that the difference between the interval separating the threshold voltage of a programmed cell from the threshold voltage of an unprogrammed cell tends to diminish.

In FIG. 2 are shown the behaviors of the threshold voltages (VTLP and VTLV) respectively of a programmed cell and an unprogrammed cell as a function of the number of deletion-programming cycles to which the memory device was subjected. It is noted that the point of intersection designated B between the two graphs corresponds to the number of deletion-programming cycles beyond which the programmed memory cell loses its ability to be used as a memorization element. Point B corresponds therefore to the limit of usefulness of the memory device. It is also noted that the distribution of the memory cells which lose their data storage ability is uniform with good approximation. This is coherent with the interpretation which can be given of the aging process of the gate oxides produced by the current transport phenomena. The error correction code acting before of the circuits which read the data stored in the memory device is capable of remedying this situation and it is thus useful for increasing the reliability of the device.

SUMMARY OF THE INVENTION

A principal object of the present invention is the provision of a memory device having high yield and reliability.

The preferred embodiment of the invention is implemented in a memory device having an input/output terminal for receiving and producing user data and a second input terminal for receiving an address signal. The memory device includes first and second memory cell arrays in which are stored respectively the user data received by the input/output terminal of the device and error identification and correction data. The memory device also includes first and second decoding means operationally connected to the first and the second memory cell arrays and to the second input terminal of the device to produce respectively select user data signals and select error identification and correction data signals. The memory device further comprises error identification means operationally coupled to the first and the second decoding means to produce a first signal at a predetermined logic level when an error is detected in the select user data signals. The memory device also includes error correction means operationally connected to the error identification means, to the second decoding means and to the input/output terminal of the device. Finally the memory device includes a control unit operationally connected to the error identification means, to the error correction means and to the second decoding means to produce a second signal responsive of the first signal, wherein said second signal is at the same predetermined logic level of said first signal and wherein said second signal produce the enabling of the error correction means and of the second decoding means.

The features and advantages of the device according to the present invention will become apparent from the following description of an embodiment thereof, given by way of example and not limitation, with reference to the accompanying drawings.

BRIEF DESCRIPTION OF THE DRAWINGS

FIG. 4 and 5 are tables showing a correspondence between values generated by the memory device of FIG.3.

DETAILED DESCRIPTION OF THE PREFERRED EMBODIMENT

The figures of the accompanying drawings generally and schematically illustrate a memory device with improved yield and reliability.

Figure 1:
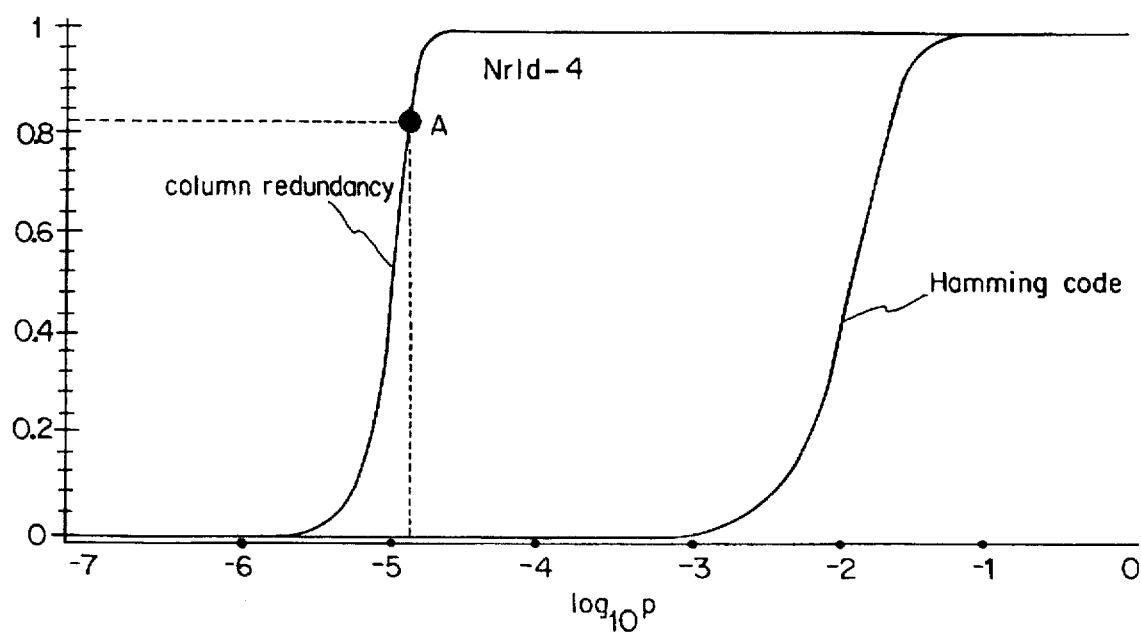
FIGS. 1 and 2 show the behavior of characteristic values of a memory device.
Figure 2:
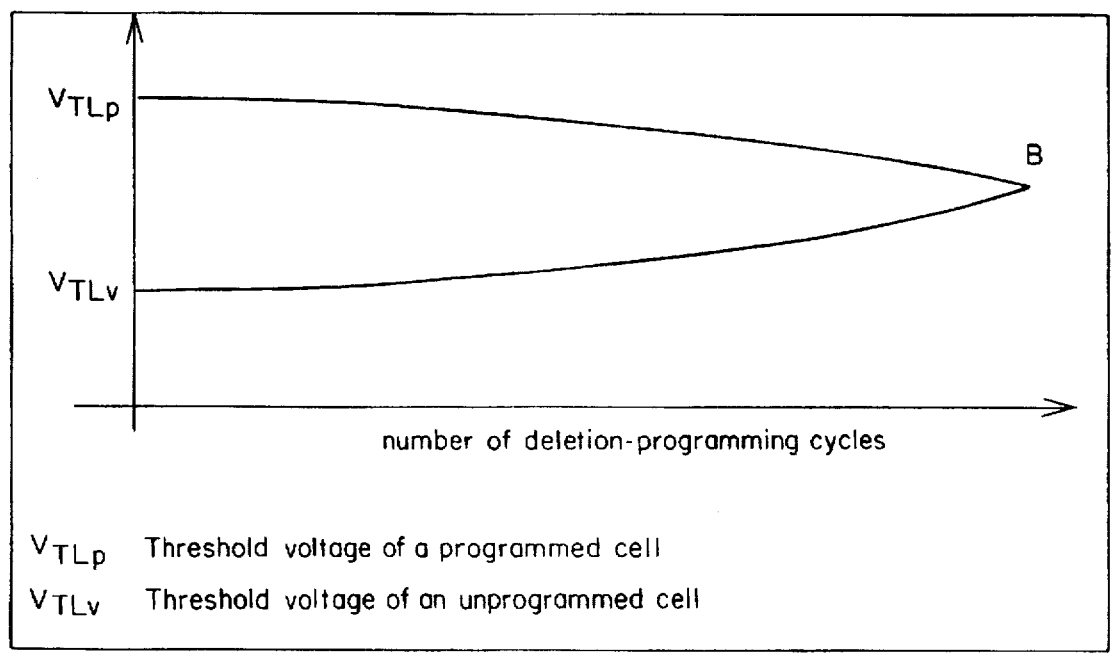
Figure 3:
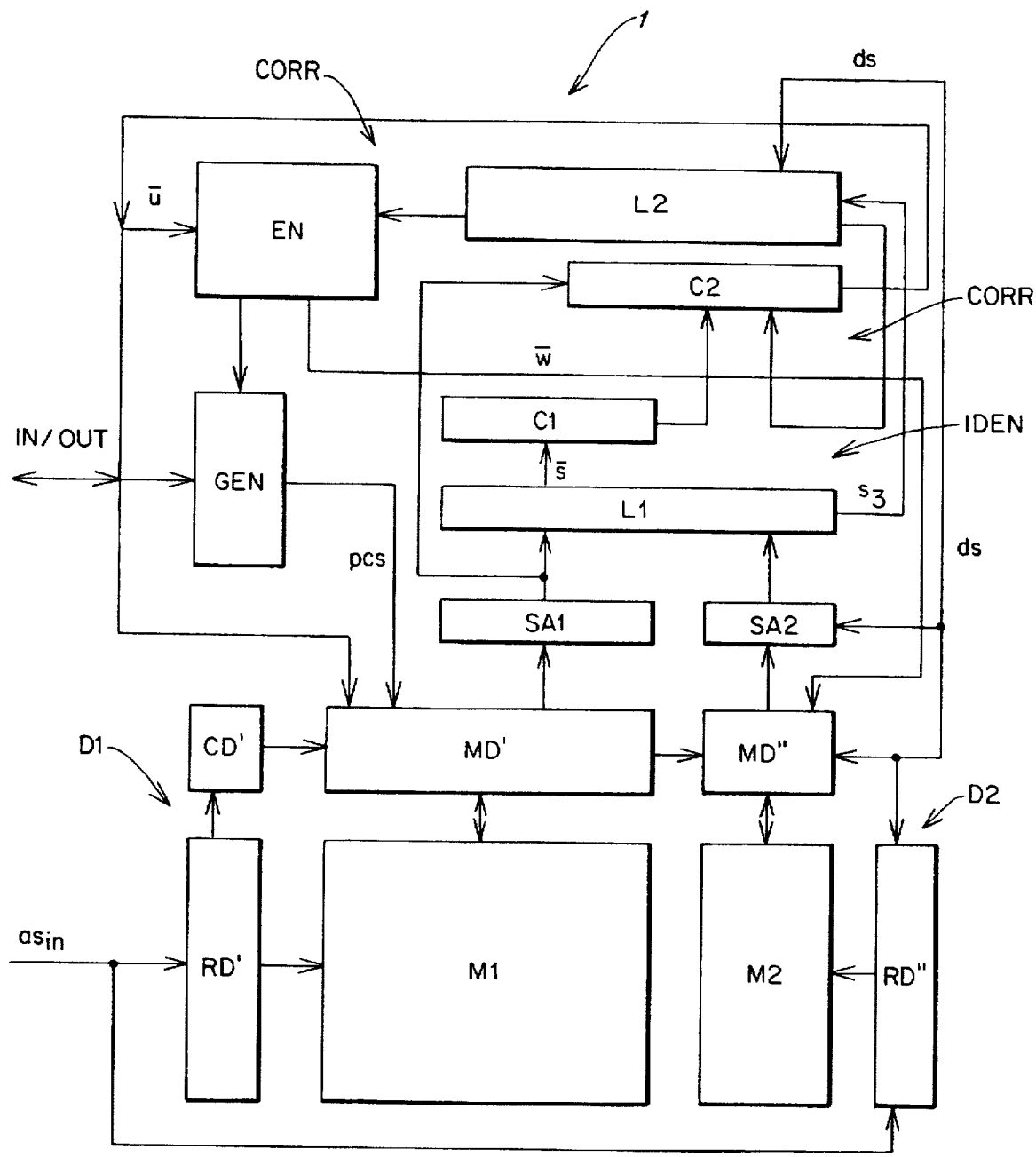
FIG. 3 is a simplified diagram of a memory device constructed according to the invention.

With particular reference to FIG. 3, a preferred embodiment of the inventive device is designated generally by reference number 1. The memory device 1 has an input/output terminal designated IN/OUT to receive and produce user data, and a second input terminal to receive an address signal designated as $as_{in}$. The memory device 1 includes first M1 and second M2 memory cell arrays organized in rows and columns. The first M1 and the second M2 memory cell arrays have respectively first and second input terminals and an output terminal. In particular, in the first memory cell array M1 are stored a plurality of user data organized in memory words including e.g. 4 bits. In the second memory cell array M2 are stored a plurality of error identification and correction data organized in memory words including e.g. 3 bits. It is also noted that each bit is memorized in a different memory cell and each user data word is associated to an error identification and correction word.

The first M1 and the second M2 memory cell arrays are connected to first D1 and second D2 decoding means to produce respectively select user data signals and select error identification and correction data signals. More specifically, the first decoding means D1 comprise a row decoding circuit RD' having an input terminal connected to the second input terminal of the device, a first output terminal connected to the first input terminal of the memory cell array M1 and a second output terminal. The first decoding means D1 also include a column decoding circuit CD' having an input terminal corresponding to the second output terminal of the row decoding circuit RD' and an output terminal. The first decoding means D1 further include a multiplexing circuit MD' having a first input terminal corresponding to the output terminal of the column decoding circuit CD', a second input terminal connected to the input/output terminal IN/OUT of the device 1, a third input terminal to receive a parity control digital signal, designated pcs, and a fourth input terminal connected to the output terminal of the first memory cell array M1. The multiplexing circuit MD' also has a first output terminal connected to the second input terminal of the first memory cell array M1, a second output terminal to produce select user data signals, and a third output terminal.

The second decoding means D2 include a second row decoding circuit RD" having a first input terminal connected to the second input terminal of the device 1, a second input terminal to receive a signal, preferably of digital type, designated ds, and an output terminal connected to the first input terminal of the second memory cell array M2. The second decoding means D2 also include a multiplexing circuit MD" having a first input terminal corresponding to the third output terminal of the multiplexing circuit MD', a second input terminal connected to the second input terminal of the second memory cell array M2, a third input terminal to receive the digital signal ds, and a fourth input terminal. The multiplexing circuit MD" also has a first output terminal connected to the output terminal of the second memory cell array M2 and a second output terminal to produce select error identification and correction data signals.

Again with reference to FIG. 31 the memory device 1 also include first SA1 and second SA2 sense amplifier circuits to read and amplify respectively the select user data signals and the select error identification and correction data signals. More specifically, the first sense amplifier circuit SA1 has an input terminal corresponding to the second output terminal of the multiplexing circuit MD' and an output terminal to produce amplified select user data signals. The second sense amplifier circuit SA2 has a first input terminal corresponding to the second output terminal of the multiplexing circuit MD", a second input terminal to receive the digital signal ds and an output terminal to produce amplified error identification and correction data signals.

The device 1 also includes error identification means IDEN comprising a parity control circuit L1 having a first input terminal corresponding to the output terminal of the first sense amplifier circuit SA1, a second input terminal corresponding to the output terminal of the second sense amplifier circuit SA2, a first output terminal to produce a digital signal, designated s3, and a second output terminal to produce a digital signals vector $\bar{s}$, denominated "syndrome".

The device 1 also comprises error correction means CORR including a first error correction circuit C1 having an input terminal corresponding to the second output terminal of the parity control circuit L1 and an output terminal. The error correction means CORR also include a second error correction circuit C2 having a first input terminal connected to the output terminal of the first sense amplifier circuit SA1, a second input terminal corresponding to the output terminal of the first error correction circuit C1, a third input terminal to receive the digital signal ds, and an output terminal connected to the input/output terminal IN/OUT of the device 1 to produce user data words designated u. The error correction means CORR further include an encoder circuit EN capable of generating an error correction code. The encoder circuit EN has a first input terminal connected to the output terminal of the second error correction circuit C2 and a second input terminal to receive the digital signal ds. The encoder circuit EN also has a first output terminal connected to the fourth input terminal of the multiplexing circuit MD" to produce code words designated $\bar{w}$ and a second output terminal.

The device 1 also includes a control unit L2, preferably of logic type, having an input terminal corresponding to the first output terminal of the parity control circuit L1, and first, second and third output terminals to produce the digital signal ds.

Finally the device 1 includes a signal generator circuit GEN having a first input terminal connected to the input/output terminal IN/OUT of the device 1, a second input terminal corresponding to the second output terminal of the encoder circuit EN and an output terminal to produce the control parity digital signal pcs.

There is now described operation of the memory device 1 in accordance with the present invention with reference to an initial state in which the logic control unit L2 keeps disabled the encoder circuit EN, the second error correction circuit C2, the row decoding circuit RD", the multiplexing circuit MD" and the second sense amplifier circuit SA2 producing the digital signal ds which is at a low logic level. The output terminal of the second sense amplifier circuit SA2 must remain constantly at low logical level to avoid altering the parity control performed by the circuit L1. In this manner the memory cells included in the second memory cell array M2 are protected from all those gate stress and drain stress phenomena which alter their functionality. It is also specified that during memorization in the first memory cell array M1 of the parity control digital signal pcs the output terminals of the encoder circuit EN must all be kept at low logic level so as not to influence the operation of the generator GEN. During reading of memory device 1 the parity control circuit L1 provides only for parity control. If the parity is respected the circuit L1 generates the digital signal s3 which is at a low logic level. In this case the logic control unit L2 continues to keep disabled the encoder circuit EN, the second error correction circuit C2, the row decoding circuit RD", the second multiplexing circuit MD" and the second sense amplifier circuit SA2.

When a single error is verified the parity of the memory word which is read at that moment is violated and the parity control circuit L1 produces the digital signal s3 to a high logic level. This signal is received by the logic control unit L2 which produces the digital signal ds at a high logic level activing the encoder circuit EN, the second error correction circuit C2, the row decoding circuit RD", the second multiplexing circuit MD" and the second sense amplifier circuit SA2. Once these circuits have been activated the digital signal s3 assumes the meaning of double-error detector, meaning that it derives from the structure of the error correction code used and which responds to a logic of the type illustrated below. It is specified that the problem of recovering the memory word which first exhibited an error can be solved only outside the memory device because the data memorized up to occurrence of the error are only sufficient for detection of the error.

Concerning the error correction code to use, a reasonable compromise between protective ability of the memory device and incidence of the parity bits can be found by choosing e.g. a code of the Hamming type. In the embodiment of the invention described herein, the Hamming code uses 136 bits memory words of which 128 bits are user bits and 8 bits are parity bits. This code is also capable of correcting single errors. In the memory device described here this code is used to complete in succession the two operations of detection and correction of the errors, having memorized initially together with each user data word $\bar{u}$ the parity control digital signal pcs allowing detection of single errors. In this manner all the memory cells included in the second memory cell array M2 are protected from aging. Indeed, these cells are used only after an single error has been detected. When the first single error has occurred the parity control digital signal pcs together with the other error identification and correction digital signals serves as a double-error detector. This can be extremely useful for having data on the time interval beyond which the memory device loses its reliability characteristics. To better clarify the above remarks it is appropriate to analyze a numerical example having recourse to the Hamming code C(7,4) where 7 is the length of the complete memory word (excluding the parity control digital signal) and 4 is the length of the user data word $\bar{u}$. This code is represented by a generating matrix G and a parity matrix H as follows:

$$G = \begin{bmatrix} 1 & 1 & 0 & 1 & 0 & 0 & 0 \\ 0 & 1 & 1 & 0 & 1 & 0 & 0 \\ 1 & 1 & 1 & 0 & 0 & 1 & 0 \\ 1 & 0 & 1 & 0 & 0 & 0 & 1 \end{bmatrix}$$

and $$H = \begin{bmatrix} 1 & 0 & 0 & 1 & 0 & 1 & 1 \\ 0 & 1 & 0 & 1 & 1 & 1 & 0 \\ 0 & 0 & 1 & 0 & 1 & 1 & 1 \end{bmatrix}$$

The correspondence between the user data words u and the code words $\bar{w}$ obtained by the coding operation can also be represented in table in FIG.4. In this case the distance of the code is 3. The code is thus able to correct single errors.

If to the user data word $\bar{u}$ is added another parity control digital signal (even parity) on the code words $\bar{w}$ there is obtained a correspondence such as that shown in the table in FIG.5. In this case the new parity matrix assumes the expression:

$$H^* = \begin{bmatrix} 1 & 0 & 0 & 1 & 0 & 1 & 1 & 0 \\ 0 & 1 & 0 & 1 & 1 & 1 & 0 & 0 \\ 0 & 0 & 1 & 0 & 1 & 1 & 1 & 0 \\ 1 & 1 & 1 & 1 & 1 & 1 & 1 & 1 \end{bmatrix}$$

which gives rise to the following form of the vector $\bar{s}$:

$$H^* \cdot (\bar{w}^*)^T = (\bar{s})^T = \begin{bmatrix} s0 \\ s1 \\ s2 \\ s3 \end{bmatrix}$$

A single error necessarily alters the parity and hence produces a syndrome vector $\bar{s}$ which has the component s3 equal to 1. In this case the data associated with the remaining components of the syndrome vector allows making the error correction by using appropriate algorithms whose structure depends on how the code is generated. In the case in point the coding has been done so as to generate the code in a systematic and cyclic form.

A double error leaves the component s3 of the syndrome vector $\bar{s}$ at zero but produces at least a 1 on the remaining components so that the error can be detected but not corrected. Supposing it is wanted to memorize the user data word $\bar{u}$:

$\bar{u}$=(0101), the error identification and correction word associated therewith is:

$\bar{u}_{cock}$=(100)

to which corresponds a code word:

$\bar{w}$=(0101100).

Adding the parity control digital signal we find:

$\overline{W}*_R=(10101100)$.

If a modellable error occurs with an 'error pattern' of the type:

$$\overline{e}=(00001000)$$

the reconstructed code word is:

$$\overline{w}*_R=(10100100)$$

which produces the syndrome vector $\overline{s}$ equal to:

$$\overline{s}=(1011).$$

The first component of the vector informs that a single error has occurred while the remaining three components allow its correction.

If the error pattern associated with the error has for example the form:

$$\overline{e}=(01000001),$$

the syndrome vector $\overline{s}$ is equal to:

$$\overline{s}=(0100).$$

In this case the first component of the vector informs that an incorrigible double error has occurred. Indeed, proceeding with the same algorithm employed for correcting the single error one would reach the word (1101001) which belongs to the code but is not the starting word.

What is claimed is:

1. A memory device including:
    first and second memory cell arrays in which are stored respectively user data and error identification and correction data;
    first and second decoding means operationally connected to the first and the second memory cell arrays for producing select user data signals and select error identification and correction data signals;
    error identification means operationally coupled to the first and the second decoding means;
    error correction means operationally connected to the first and the second decoding means and to the error identification means; and
    a control unit operationally connected to the second decoding means, to the error identification means and to the error correction means to enable the second decoding means and the error correction means if the error identification means detect an error in the select user data signals.

2. The device of claim 1, wherein the error identification means are operationally coupled to the first and the second decoding means through respectively first and second sense amplifier circuits, wherein the second amplifier circuit is also operationally connected to the control unit.

3. The device of claim 1, wherein the control unit is of logic type.

4. The device of claim 1, wherein the error identification means include a parity control circuit having an output terminal to produce a first signal at a predetermined logic level.

5. The device of claim 4, wherein the predetermined logic level is a high logic level.

6. The device of claim 4, wherein the control unit has an input terminal for receiving the first signal at the predetermined logic level and first, second and third output terminals to produce a second signal at the same predetermined logic level of the first signal.

7. The device of claim 6, wherein the first and the second signal are of digital type.

8. Method for allowing error identification and correction in a memory device including:
    first and second memory cell arrays in which are stored respectively user data and error identification and correction data;
    first and second decoding means operationally connected to the first and the second memory cell arrays for producing select user data signals and select error identification and correction data signals;
    error identification means operationally coupled to the first and the second decoding means; and
    error correction means operationally connected to the first and the second decoding means and to the error identification means, wherein the method includes the steps of:
    detecting an error in the select user data signals through the error identification means;
    generating a first signal at a predetermined logic level through the error identification means;
    generating a second signal at the same predetermined logic level of the first signal through a control unit operationally connected at outputs of the error identification means and at inputs of the error correction means and of the second decoding means; and
    enabling the second decoding means and the error correction means through said second signal.

9. The device of claim 8, wherein the first and the second signal are of digital type.

10. The device of claim 8, wherein the predetermined logic level is a high logic level.

11. The device of claim 8, wherein the control unit is of logic type.

12. A memory device having an input/output terminal for receiving and producing user data and a second input terminal for receiving an address signal, wherein the memory device includes:
    first and second memory cell arrays in which are stored respectively the user data received by the input/output terminal of the device and error identification and correction data;
    first and second decoding means operationally connected to the first and the second memory cell arrays and to the second input terminal of the device to produce respectively select user data signals and select error identification and correction data signals;
    error identification means operationally coupled to the first and the second decoding means to produce a first signal at a predetermined logic level when an error is detected in the select user data signals;
    error correction means operationally connected to the error identification means, to the second decoding means and to the input/output terminal of the device; and
    a control unit operationally connected to the error identification means, to the error correction means and to the second decoding means to produce a second signal in response to the first signal, wherein said second signal is at the same predetermined logic level of said first signal and wherein said second signal produce the enabling of the error correction means and of the second decoding means.

13. The device of claim 12, wherein the error identification means are operationally coupled to the first and the second decoding means through respectively first and second sense amplifier circuits, wherein the second amplifier circuit is also operationally connected to the control unit.

14. The device of claim 12, wherein the error identification means include a parity control circuit having an output terminal to produce the first signal at the predetermined logic level.

15. The device of claim 12, wherein the first and the second signal are of digital type.

16. The device of claim 12, wherein the control unit is of logic type.

* * * * *